(12) United States Patent
Kim et al.

(10) Patent No.: US 10,575,212 B2
(45) Date of Patent: Feb. 25, 2020

(54) METHOD BY WHICH NETWORK NODES CALCULATE OPTIMUM PATH FOR VIRTUALIZED SERVICE FUNCTIONS

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Hyunsook Kim, Seoul (KR); Jaiyong Lee, Seoul (KR); Yujeong Oh, Seoul (KR); Seokhwan Kong, Seoul (KR); Jonghun Kim, Seoul (KR)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 16/070,199

(22) PCT Filed: Jan. 29, 2016

(86) PCT No.: PCT/KR2016/000964
§ 371 (c)(1),
(2) Date: Jul. 13, 2018

(87) PCT Pub. No.: WO2017/131259
PCT Pub. Date: Aug. 3, 2017

(65) Prior Publication Data
US 2019/0014496 A1 Jan. 10, 2019

(51) Int. Cl.
*H04W 28/06* (2009.01)
*H04L 29/08* (2006.01)
(Continued)

(52) U.S. Cl.
CPC ............ *H04W 28/06* (2013.01); *H04L 29/08* (2013.01); *H04L 45/38* (2013.01); *H04W 4/50* (2018.02); *H04W 28/08* (2013.01)

(58) Field of Classification Search
None
See application file for complete search history.

(56) References Cited

U.S. PATENT DOCUMENTS 9,379,931 B2 * 6/2016 Bosch ...................... H04L 29/06
9,762,402 B2 * 9/2017 Batz ..................... H04L 12/1407
(Continued)

FOREIGN PATENT DOCUMENTS

| EP | 2945329 | 11/2015 |
|---|---|---|
| KR | 101460048 | 11/2014 |
| WO | 2015149831 | 10/2015 |

OTHER PUBLICATIONS

PCT International Application No. PCT/KR2016/000964, International Search Report dated Sep. 28, 2016, 4 pages.
(Continued)

*Primary Examiner* — Ayaz R Sheikh
*Assistant Examiner* — Faiyazkhan Ghafoerkhan
(74) *Attorney, Agent, or Firm* — Lee Hong Degerman Kang Waimey

(57) ABSTRACT

Disclosed in the present specification is a method by which network nodes calculate an optimum path for virtualized service functions (SFs). The method can comprise the steps of: generating a service function chain (SFC), in which SFs are put in order, on the basis of subscriber information-based user policy information, session policy information, and SF state information; searching for an optimum SF set on the basis of the SFC so as to calculate an optimum service function path (SFP); and updating the SFP when any one of the subscriber information-based user policy information,
(Continued)

session policy information, and SF state information is changed.

8 Claims, 16 Drawing Sheets

(51) Int. Cl.
*H04L 12/721* (2013.01)
*H04W 4/50* (2018.01)
*H04W 28/08* (2009.01)

(56) References Cited

U.S. PATENT DOCUMENTS

| | | | | |
|---|---|---|---|---|
| 9,825,769 B2* | 11/2017 | Batz | | H04L 12/1407 |
| 2015/0236948 A1* | 8/2015 | Dunbar | | H04L 45/22 |
| | | | | 370/225 |
| 2015/0281173 A1* | 10/2015 | Quinn | | H04L 61/256 |
| | | | | 709/245 |
| 2015/0333930 A1* | 11/2015 | Aysola | | H04L 63/0471 |
| | | | | 370/392 |
| 2015/0334094 A1* | 11/2015 | Suresh | | H04L 63/0471 |
| | | | | 713/153 |
| 2015/0334595 A1* | 11/2015 | Bosch | | H04L 29/06 |
| | | | | 370/235 |
| 2015/0341285 A1* | 11/2015 | Aysola | | H04L 63/0428 |
| | | | | 370/392 |
| 2015/0365322 A1* | 12/2015 | Shatzkamer | | H04L 45/74 |
| | | | | 370/392 |
| 2016/0344565 A1* | 11/2016 | Batz | | H04L 12/1407 |
| 2016/0344803 A1* | 11/2016 | Batz | | H04L 12/1407 |
| 2017/0208011 A1* | 7/2017 | Bosch | | H04L 47/25 |
| 2017/0214535 A1* | 7/2017 | Li | | H04L 12/1407 |
| 2017/0300352 A1* | 10/2017 | Lou | | H04L 29/08 |

OTHER PUBLICATIONS

European Patent Office Application Serial No. 16888236.3, Search Report dated Aug. 9, 2019, 9 pages.
Kumar, et al., "Service Function Path Optimization" Oct. 2014, 15 pages.
ETSI, "Network Functions Virtualisation (NFV); Ecosystem; Report on SDN Usage in NFV Architectural Framework", ETSI GS NFV-EVE 005 V1.1.1, Dec. 2015, 125 pages.

* cited by examiner

METHOD BY WHICH NETWORK NODES CALCULATE OPTIMUM PATH FOR VIRTUALIZED SERVICE FUNCTIONS

CROSS-REFERENCE TO RELATED APPLICATIONS

This application is the National Stage filing under 35 U.S.C. 371 of International Application No. PCT/KR2016/000964, filed on Jan. 29, 2016, the contents of which are hereby incorporated by reference herein in its entirety.

BACKGROUND OF THE INVENTION

Field of the Invention

The present invention relates to the virtualization of a mobile communication network.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |

TABLE 1-continued

| REFERENCE POINT | DESCRIPTION |
|---|---|
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 3, the RRC layer, the RLC layer, the MAC layer, and the PHY layer placed under the NAS layer are also collectively called an Access Stratum (AS).

Meanwhile, in the future, the virtualization of entities (e.g., S-GW, MME, and P-GW) on a core entity through a virtual machine (VM) is being discussed. Specifically, a method of operating a virtual network function (VNF)/service function (SF), that is, a virtual base station (VBS), an S-GW, an MME, and a P-GW, by driving a virtual machine on a hardware resource pool, that is, a set of hardware (HW) is being discussed.

Furthermore, a method of virtualizing network entities, such as a firewall (FW), a load balancer, and an optimizer, through a virtual machine is being discussed.

A network defined in software through virtualization as described above is called software defined networking (SDN).

However, architecture of a network virtualized so far as described above has not yet been specifically suggested. Furthermore, if a service function (SF) in which a specific network node has been virtualized is present in plural, a method of finding an optimal path for the processing of traffic has not yet been suggested.

SUMMARY OF THE INVENTION

Accordingly, an object of the present invention is to present a method that can solve the aforementioned problem.

In order to achieve the object, one disclosure of this specification provides a method of calculating an optimal path for service functions (SF) in which network nodes have been virtualized. The method may include the steps of generating a sequenced service function chain (SFC) of SFs based on user policy information based on subscriber information and state information of the SFs; calculating an optimal service function path (SFP) by finding an optimal SF set based on the SFC; and updating the SFP when any one of the user policy information based on the subscriber information, the session policy information and the state information of the SFs is changed.

The method may further include the steps of receiving the user policy information based on the subscriber information from a policy and charging rule function (PCRF) and receiving the state information of the SFs from an SF management unit.

The method may further include the step of receiving service requirements. In this case, the SFC may be generated by taking the service requirements into consideration.

The method may further include the step of forwarding the SFP to service function forward (SFF) and a classifier. In this case, the classifier may be a packet data network-gateway (P-GW).

The SF may include one or more of a virtualized firewall, a virtualized optimizer, a virtualized network address translator (NAT), and a virtualized load balancer. The SFC may define the sequence of one or more of the virtualized firewall, the optimizer, the NAT, and the load balancer. The SFP may define a specific set of a plurality of the virtualized firewalls, a plurality of the virtualized optimizers, a plurality of the virtualized NATs, and a plurality of the virtualized load balancers.

The steps may be performed by a software defined networking (SDN) controller. The SDN controller may include a monitoring unit monitoring the state of the SFs; a chain generator generating the SFC; and an SFP optimizer calculating the optimal SFP.

In order to achieve the object, one disclosure of this specification provides a software defined networking (SDN) controller calculating an optimal path for service functions (SF) in which network nodes have been virtualized. The SDN controller may include a monitoring unit monitoring the state of the SFs; a chain generator generating a sequenced service function chain (SFC) of the SFs based on user policy information based on subscriber information and state information of the SFs; and an SFP optimizer calculating an optimal service function path (SFP) by finding an optimal SF set based on the SFC.

In accordance with the disclosure of this specification, there is proposed the method capable of finding an optimal path for service functions (SF) in a software defined networking (SDN) environment in which network nodes have been virtualized.

DESCRIPTION OF EXEMPLARY EMBODIMENTS

Figure 1:
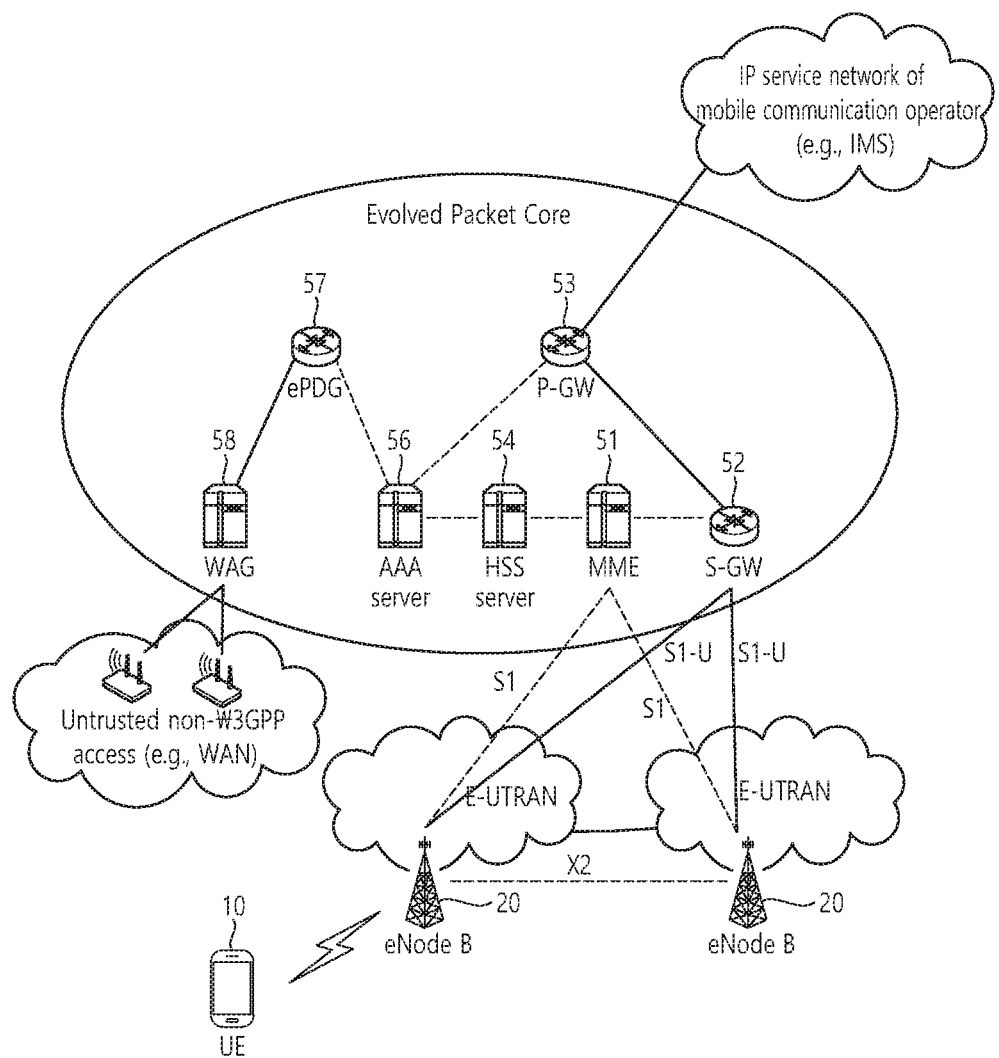
FIG. 1 is a structural diagram of an evolved mobile communication network.
Figure 2:
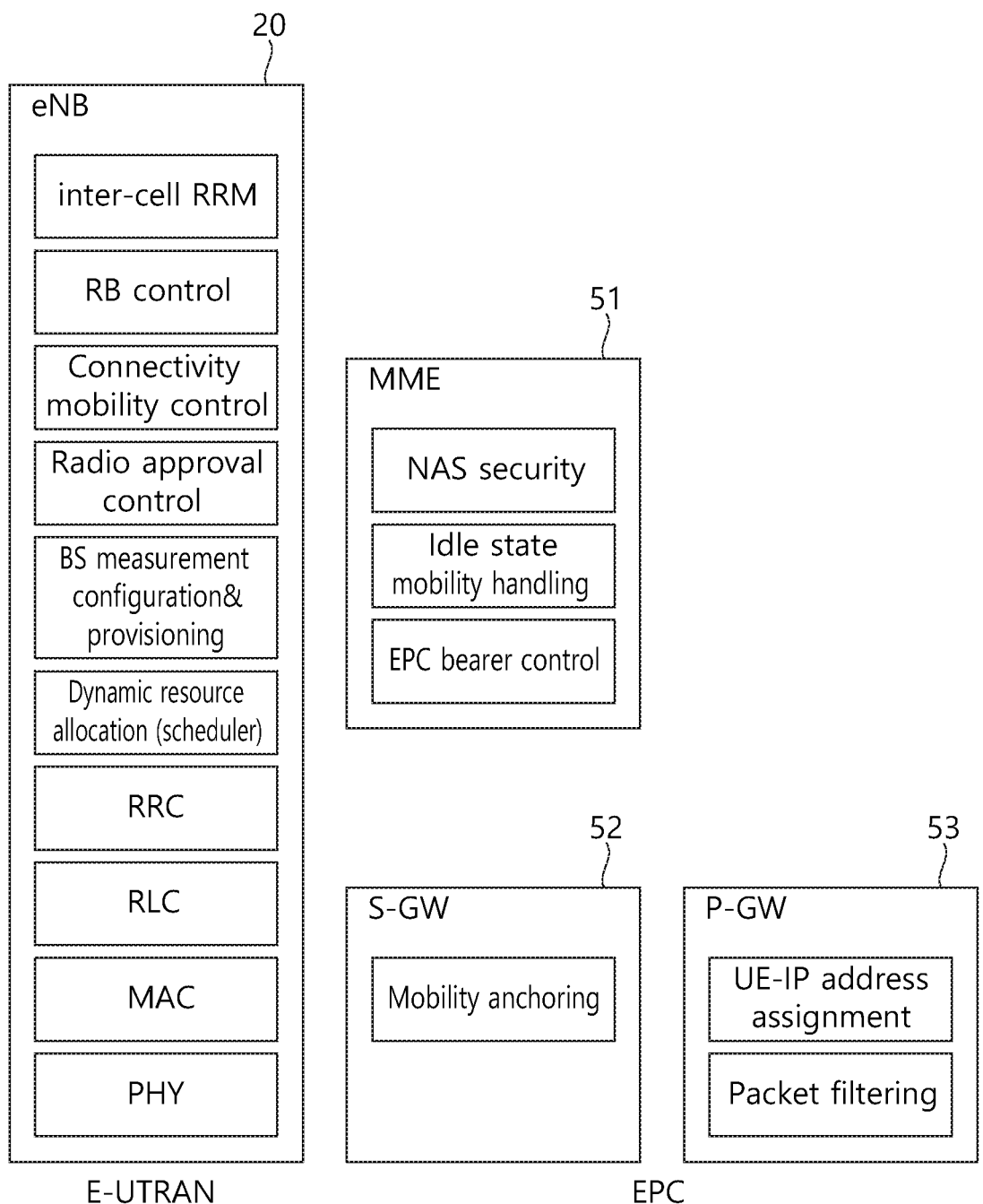
FIG. 2 is an exemplary diagram illustrating architectures of a general E-UTRAN and a general EPC.
Figure 3:
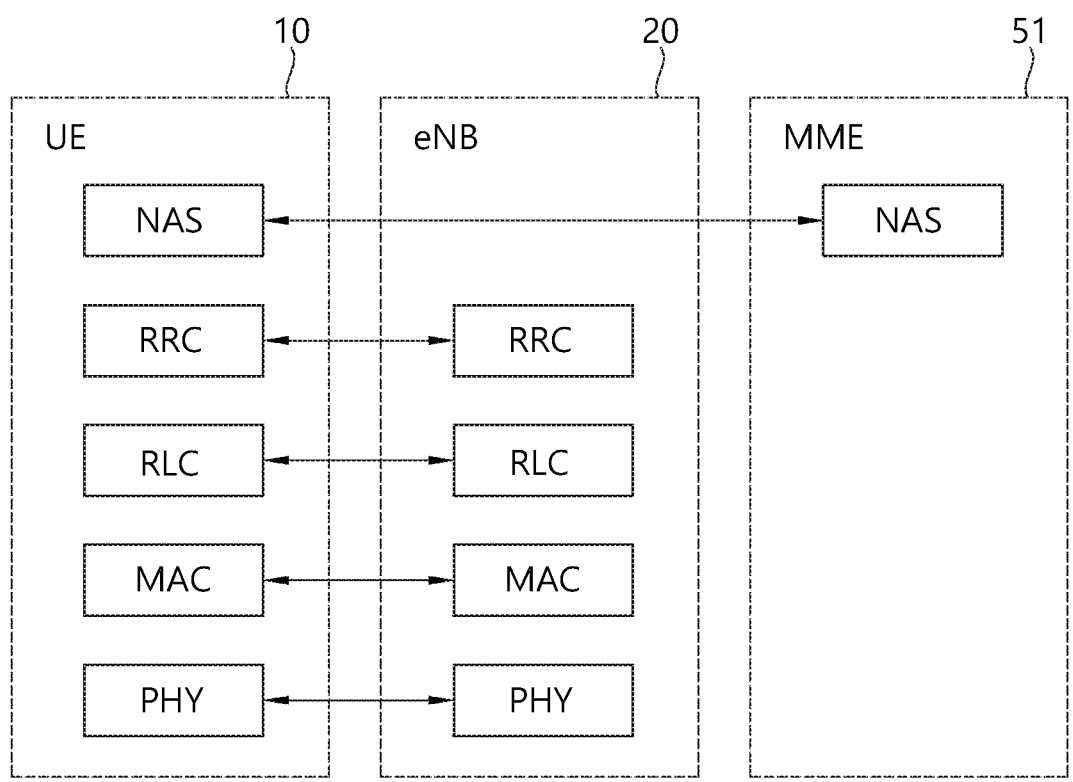
FIG. 3 is an exemplary diagram illustrating a structure of a radio interface protocol on a control plane between UE and eNodeB.
Figure 4:
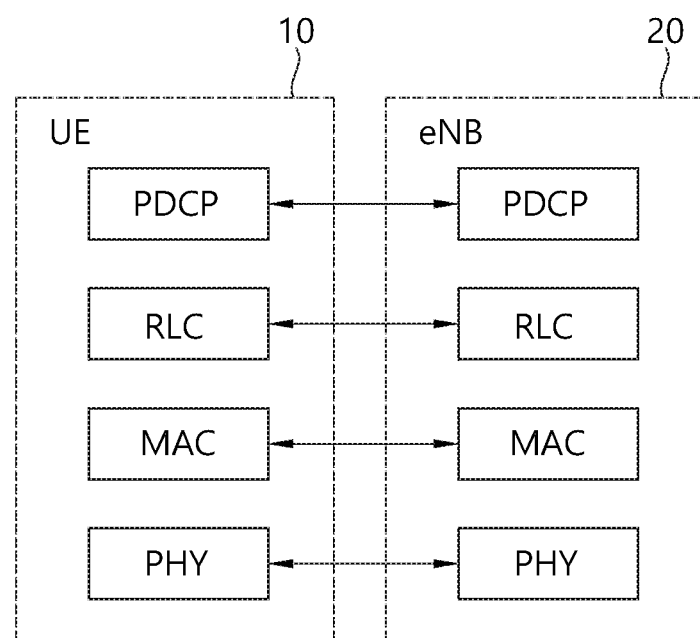
FIG. 4 is another exemplary diagram illustrating a structure of a radio interface protocol on a user plane between the UE and a base station.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted as a terminal or a mobile equipment (ME). The UE may be a laptop computer, a mobile phone, a PDA, a smartphone, a multimedia device, or other portable device, or may be a stationary device such as a PC or a car-mounted device.

Definition of Terms

For a better understanding, the terms used herein are briefly defined before going to the detailed description of the invention with reference to the accompanying drawings.

An UMTS is an abbreviation of a Universal Mobile Telecommunication System, and it refers to the core network of the 3rd generation mobile communication.

A UE/MS is an abbreviation of a user equipment/mobile station, and it refers to a terminal device.

An EPS is an abbreviation of an evolved packet system, and it refers to a core network supporting a long term evolution (LTE) network and to a network evolved from an UMTS.

A PDN is an abbreviation of a public data network, and it refers to an independent network where a service for providing service is placed.

A PDN-GW is an abbreviation of a packet data network gateway, and it refers to a network node of an EPS network which performs functions, such as the allocation of a UE IP address, packet screening & filtering, and the collection of charging data.

A serving gateway (serving GW) is a network node of an EPS network which performs functions, such as mobility anchor, packet routing, idle mode packet buffering, and triggering an MME to page UE.

A policy and charging rule function (PCRF): The node of an EPS network which performs a policy decision for dynamically applying QoS and a billing policy that are different for each service flow.

A NodeB is an eNodeB of a UMTS network and installed outdoors. The cell coverage of the NodeB corresponds to a macro cell.

An eNodeB is an eNodeB of an evolved packet system (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from a UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

A non-access-stratum (NAS): A higher stratum of a control plane between a UE and an MME. The NAS supports mobility management, session management, IP address management, etc., between the UE and the network.

A PLMN: an abbreviation of a public land mobile network and means a network identification number of a mobile communication provider. In the roaming case of a UE, the PLMN is classified as a home PLMN (HPLMN) and a visited PLMN (VPLMN).

A virtual machine (VM): a virtual computer generated by the virtualization technology.

A virtual network (VN): a virtual network produced by applying the SDN technology to network devices produced by various manufacturers.

Software defined networking (SDN): a scheme responsible for the control plane of all of network devices in a central controller in order to assign programmability to the network devices.

A service function (SF): a component function responsible for network services and processes a single packet or traffic. A corresponding component denotes only a logical entity according to each function, and an instance for an actual operation is mounted and executed in a software-shared network resource or physical-dedicated equipment. One or more instances may be present with respect to one service function.

A virtual network function (VNF): a virtual network function operated in a virtual machine and has a meaning similar to an SF.

A service function chain (SFC): a logical path indicating that a received packet or traffic will be processed by which service function according to which sequence. A service chain is defined according to a network service policy. Each chain is selected depending on a traffic classification function.

A service function path (SFP): denotes an instance of a logically defined service chain. This is a path along which a network packet and traffic is actually delivered as the results of mapping a logical service chain to a service function instance, a physical service node, etc. on an actual network.

ETSI NFV ISG: an abbreviation of European Telecommunications Standards Institute Network Function Virtualization Industry Specification Group.

Network function virtualization (NFV): a scheme in which a network function implemented in hardware in a conventional technology using virtualization technology in servers for common purposes is operating on a virtual machine.

Network function virtualization infrastructure (NFVI): all of types of infrastructure, such as a processor, memory, a network, and a hypervisor present to provide a virtual machine and a virtual network.

A network function (NF): denotes equipment responsible for network-related services, for example, an optimizer, a firewall, a network address translator (NAT), and a gateway.

A virtual infrastructure manager (VIM): a management domain that controls and manages the NFVI.

A virtual network function component (VNFC): a network function of a small unit that forms one VNF.

A VNF forwarding graph (VNFFG): the chaining of VNFs configured to provide a general network service. An actual flow passes along a corresponding path. The VNFFG has a meaning similar to the SFC.

Hereinafter, the disclosure of this specification is described with reference to the drawings.

Figure 5:
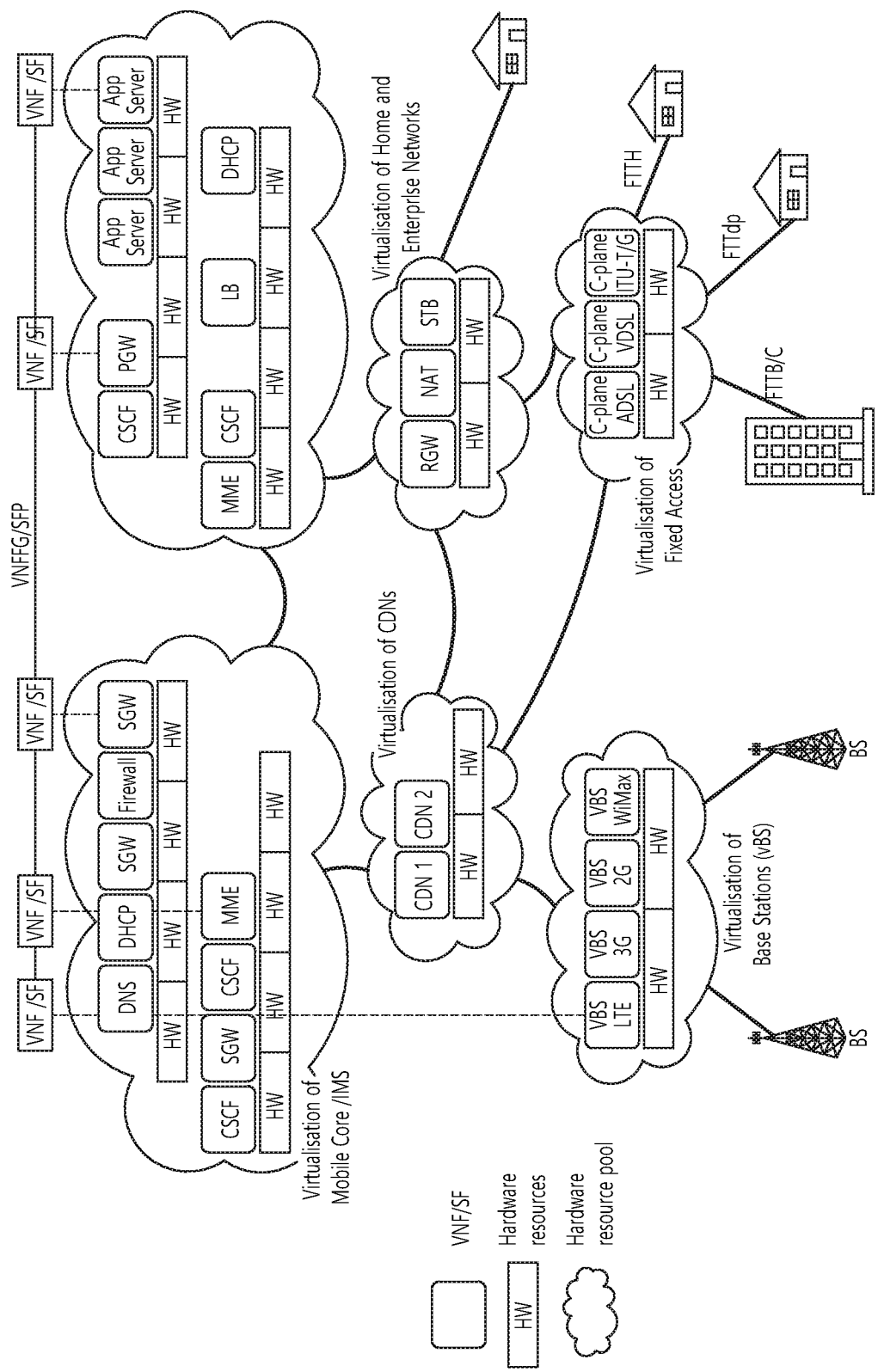
FIG. 5 shows a conceptual example of network virtualization.

FIG. 5 shows a conceptual example of network virtualization.

Today, in operating a network, various network functions (NF), such as a core entity (e.g., S-GW, MME and P-GW) and other network entities (e.g., firewall (FW), load balancer and optimizer), are used.

However, in the future, as shown in FIG. 5, entities (e.g., S-GW, MME and P-GW) on the core entity may be virtualized through a virtual machine (VM). Specifically, a virtual network function (VNF)/service function (SF), that is, a virtual base station (VBS), an S-GW, an MME, and a P-GW, may be operated by driving a virtual machine on a hardware resource pool, that is, a set of hardware (HW).

Furthermore, network entities, such as a firewall (FW), a load balancer, and an optimizer, may be virtualized through a virtual machine.

The existing network had a form in which network service functions are present on a data delivery path between a source and a destination host. In contrast, if the network function virtualization (NFV) technology is introduced, a network service function has a form in which data traffic passes through its desired network service function not a form in which data traffic is present on a data delivery path. As described above, the abstraction of service functions necessary for a specific service and an application sequence between the service functions is a service function chain (SFC).

A path to which the VNFs/SFs are connected is called a virtual network function forwarding graph (VNFFG)/service function path (SFP).

Such network function virtualization (NFV) is being discussed as multiple different names, and the names are described below.

(a) Proposal in NFV ISG of ETSI

The NFV ISG of European Telecommunications Standards Institute (ETSI) proposes network function virtualization infrastructure (NFVI) in order to provide a flexible and agile network service.

Figure 6:
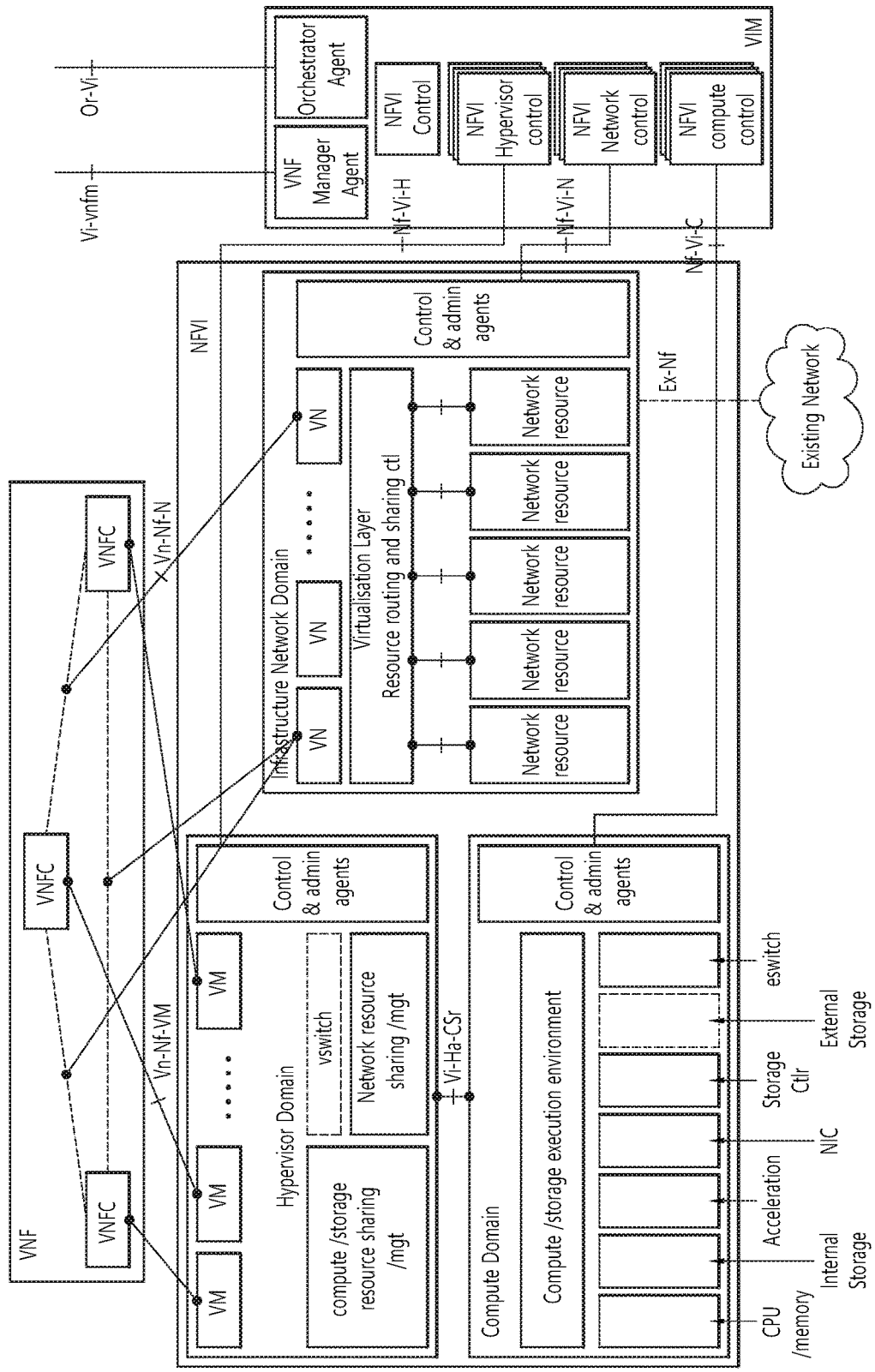
FIG. 6 shows an example of an NFVI proposed in the NFV ISG of the ETSI.

FIG. 6 shows an example of the NFVI proposed in the NFV ISG of the ETSI.

Referring to FIG. 6, the NFVI includes an infrastructure network domain in which virtual networks (VN) produced by virtualizing network resources have been deployed, a computing domain in which hardware resources (e.g., CPU/memory/repository) have been deployed, and a hypervisor domain in which a virtual machine (VM) is generated using a hypervisor.

Furthermore, referring to FIG. 6, there is a virtual infrastructure manager (VIM) responsible for control and management of the three domains. The domains are interconnected by interfaces.

In such a structure, a VNF providing virtual network services using the VM and the VN may be operated.

(b) FMSS structure proposed in 3GPP

3GPP proposes a concept called flexible mobile service steering (FMSS) for the SFC of wireless mobile communication traffic and proposes requirements and a structure in an (s)Gi-LAN therefor.

Figure 7:
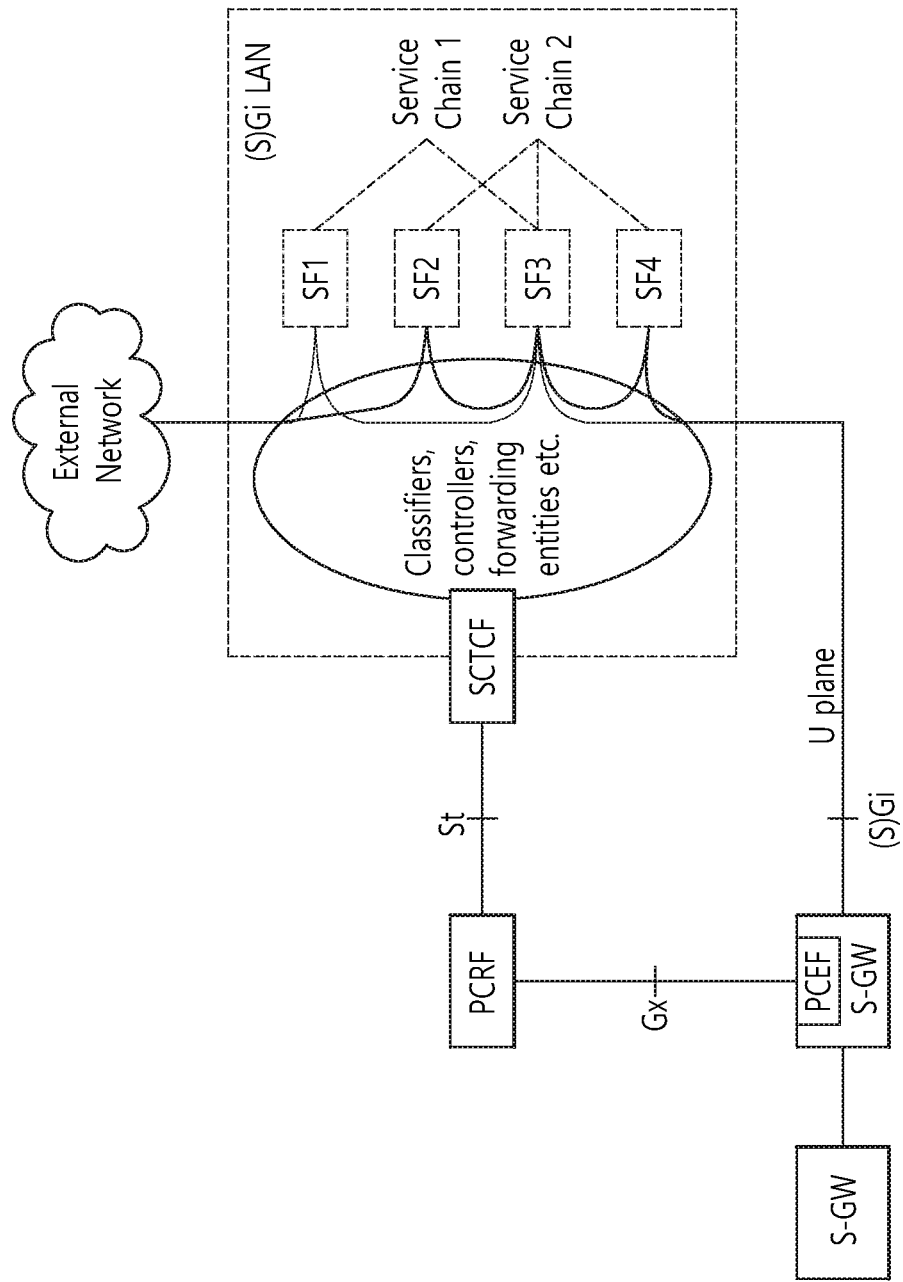
FIG. 7 shows an example of the FMSS structure proposed in 3GPP.

FIG. 7 shows an example of the FMSS structure proposed in 3GPP.

In 3GPP, when multiple SFs are present in the (s)Gi-LAN, multiple functions within EPC are used for SFC. In particular, a policy for SFC is received from a policy and charging function (PCRF). The policy includes subscription information of a user, the policy of a network operator, etc. Furthermore, for a classifier, a function is added to a TDF, a PGW, etc. and used. The classifier may be a P-GW. In the 3GPP standard, new functions are defined to this end. A new function and interface are defined to support the new functions.

The structure shown in FIG. 7 has been proposed as one of structure solutions for FMSS, and supports SFC in the (s)Gi-LAN by adding a new function called an "SCTCF."

As described above, 3GPP proposes only a brief structure for the SFC of wireless mobile communication traffic.

However, 3GPP has not proposed a detailed structure thereof.

Furthermore, in 3GPP, a detailed method of steering traffic is not described, and it is said that a solution proposed in other standard organization can be used. However, standard organizations, such as ETSI and IETF, propose only a concept for SFC realization so far.

Furthermore, research on a method of finding an optimal node and the SFP of a path in given SFC is not sufficient so far. To find an optimal SFP may be said to have greater complexity than routing because a path passing through multiple SFs must be found unlike a routing scheme for finding a path in a given transmission-reception pair. Furthermore, if an SF performing the same function is present in plural, the complexity of the scheme of finding an optimal SF is very great. In particular, if a change of a policy, a change of the SF, and the variables of the state of a network are taken into consideration, research on a scheme of finding optimal SFPs capable of providing proper QoS to all of services is insufficient.

<Disclosure of this Specification>

Accordingly, the disclosure of this specification proposes an SFP optimization method of a software defined networking (SDN) controller in order to provide an optimal SFC service in which a network state and the requirements and characteristics of a service are taken into consideration in a wireless mobile communication network.

Figure 8:
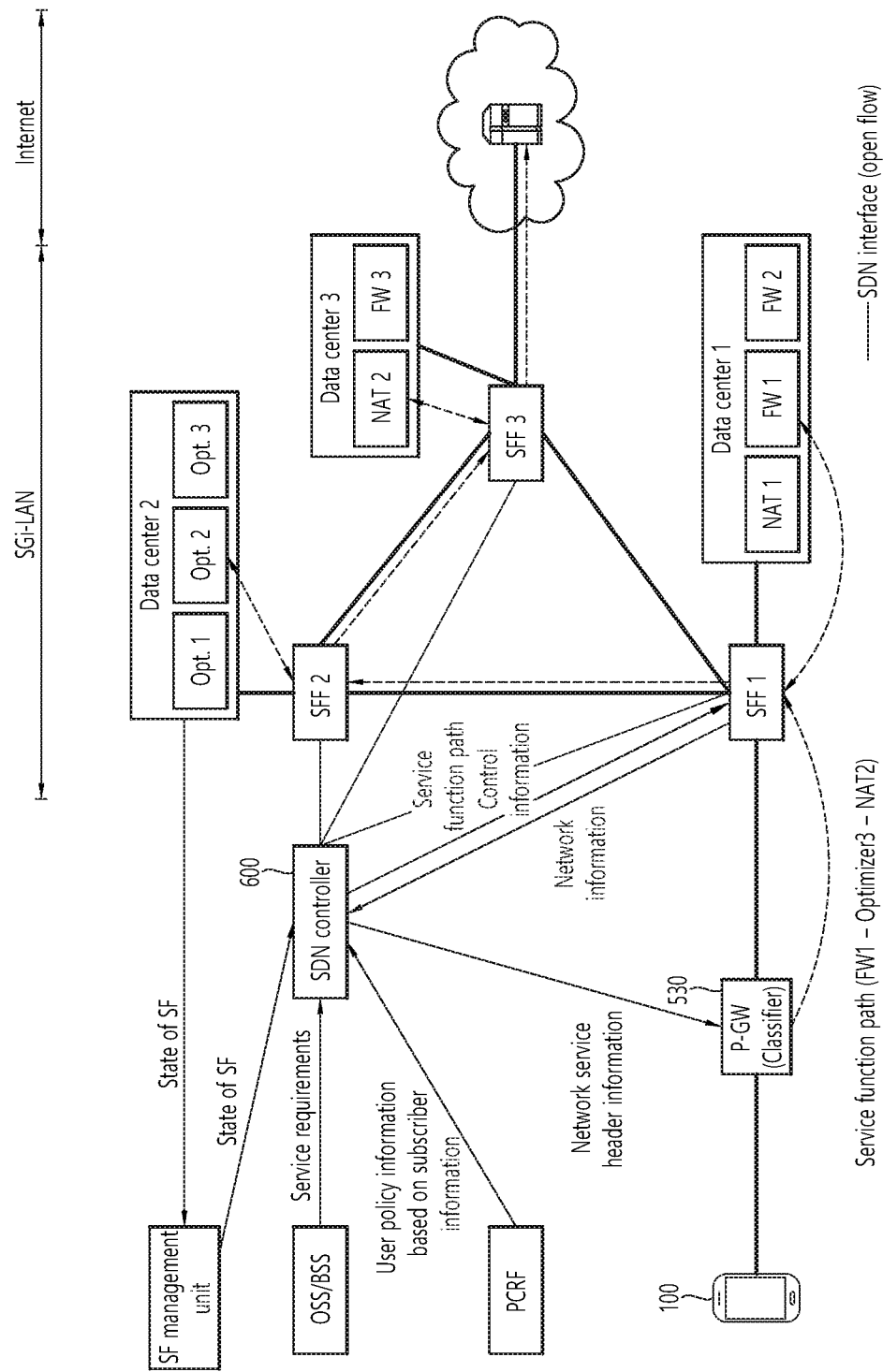
FIG. 8 shows the structure of a network virtualization according to the disclosure of this specification and an operation thereof.

FIG. 8 shows the structure of a network virtualization according to the disclosure of this specification and an operation thereof.

Referring to FIG. 8, there is shown an environment including EPC (i.e., S-GW, P-GW, MME, and PCRF) and a data center positioned in the SGi-LAN of a network operator. SFs (e.g., optimizer, NAT, and firewall) operating using the virtualization technology and a hypervisor on hardware are present within the data center.

The illustrated operations support system (OSS)/business support system (BSS) functions to accommodate the service requirements of a service application or external service manager (OTT operator, portal operator or CDN operator) that requests a network service. The service requirements are delivered to the SDN controller and used to calculate an optimal SFP.

An SF management unit transmits state information of all of data centers within a network operator and state information (CPU occupation ratio, memory usage) of the SFs operated within the data center to the SDN controller. The state information of the SFs is collected by the monitoring function of each data center. The state information of each data center may be directly collected by the SDN controller.

The PCR of the EPC functions to transmit information about a subscriber who uses a wireless mobile communication network and information regarding that the subscriber uses/may use which service and a user policy to the SDN controller. Additionally, the PCR functions to transmit a policy for a session used by a subscriber.

The SDN controller proposed in this specification functions to receive information about service requirements, state information of SFs, a subscriber, and a session, and to calculate an optimal SFP based on the received information. The SFP is a virtual path (e.g., Optimizer3-NAT2-FW1) configured by specific SFs in order to provide a network service.

When the optimal SFP is determined, routing information is delivered through an interface between the SDN controller and a service function forwarder (SFF), so the routing table of the SFF is configured.

When the IP packet of a user terminal of a wireless mobile communication network is transmitted to the classifier, that is, the P-GW, the classifier (i.e., P-GW or TDF) determines that the corresponding packet corresponds to which SFC and adds a matched network service header to the IP packet. Accordingly, the corresponding packet receives a network service via a predetermined SF and is delivered to the final destination on the Internet.

Figure 9:
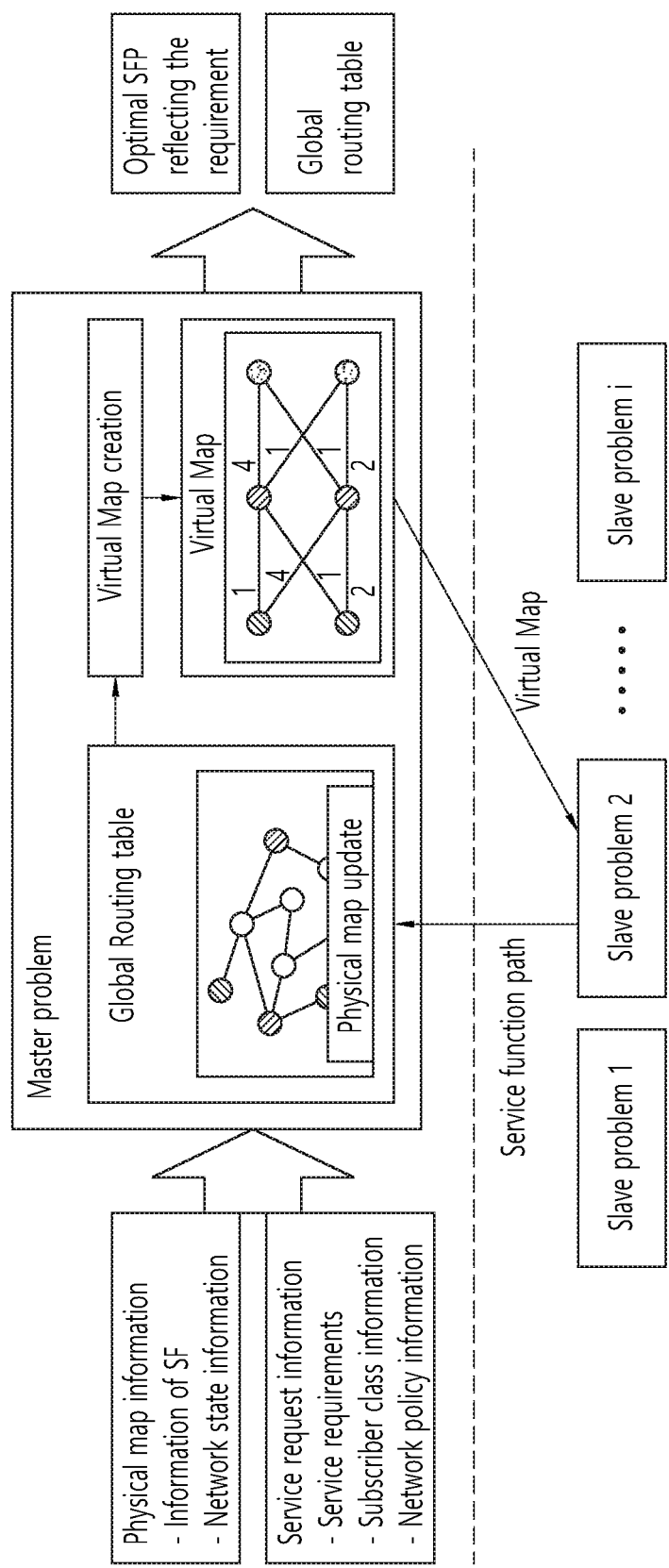
FIG. 9 is an exemplary diagram showing an optimization method according to the disclosure of this specification.

FIG. 9 is an exemplary diagram showing an optimization method according to the disclosure of this specification.

FIG. 9 is a diagram showing a method of finding an optimal SFP the requirements of wireless mobile communication traffic and the network state of an (S)Gi-LAN. In this specification, in order to reduce complexity, an optimal SFP is found by dividing it into one master problem and i slave problems corresponding to i service flows, respectively. The two algorithms are driven by the SDN controller.

A master problem solution unit calculates the routing of all of networks and collects and manages information, such as topology information (link, switch information, usage information of SFs) of the networks. The master problem solution unit generates a virtual map for a slave problem corresponding to each service flow based on the information.

A slave problem solution unit finds an optimal SF set of SFC candidates corresponding to each service flow. To this end, the slave problem solution unit finds an optimal SFP through a dynamic programming scheme based on the virtual map received from the master problem solution unit.

The optimal SFP found by the slave problem solution unit is transmitted to the master problem solution unit. The master problem solution unit updates a physical map based on an optimal SFP set.

The transmitted information and operation are described more specifically below.

The master problem solution unit obtains physical map information and service request information. The physical map information is information for generating the routing table of the (S)Gi-LAN, and includes SF information obtained from the SF management unit, usage information of a corresponding SF, and network information (available link bandwidth, delay parameter, etc.) obtained from an SDN protocol (e.g., OpenFlow). The service request information is information about a service flow, and includes service requirements obtained from the OSS/BSS and subscriber class information, network policy information, etc. from the PCRF.

The master problem solution unit performs routing within the (S)Gi-LAN based on the physical map and retains the routing. Furthermore, the master problem solution unit generates a virtual map corresponding to a service flow based on service request information. The virtual map includes a collection of sets that may be selected as each chain element of an SFC (e.g., FW-IDS-LB) requested by each service flow.

The first slave problem solution unit of the i slave problem solution units finds an optimal SFP based on a virtual map 1 received from the master problem solution unit. In this case, the first slave problem solution unit finds an optimal set of candidates SFs by taking into consideration the requirements (e.g., bandwidth, latency) of each service flow and a network policy. This set becomes the optimal SFP. Accordingly, the first slave problem solution unit transmits the optimal SFP to the master problem solution unit.

The master problem solution unit updates the physical map (e.g., SF usage, available bandwidth) based on the optimal SFP information obtained from the slave problem solution unit, and generates a virtual map 2 for the second slave problem solution unit based on the updated physical map.

Finally, when the execution of the last slave problem solution unit is completed, an optimal SFP for all of the service flows is selected.

If all of SFC requests are not processed due to an insufficient capacity, the master problem and the slave problem can be solved so that SFCs are accommodated as much as possible by selecting a competitor of a not-accommodated SFC and switching priority between them.

Figure 10:
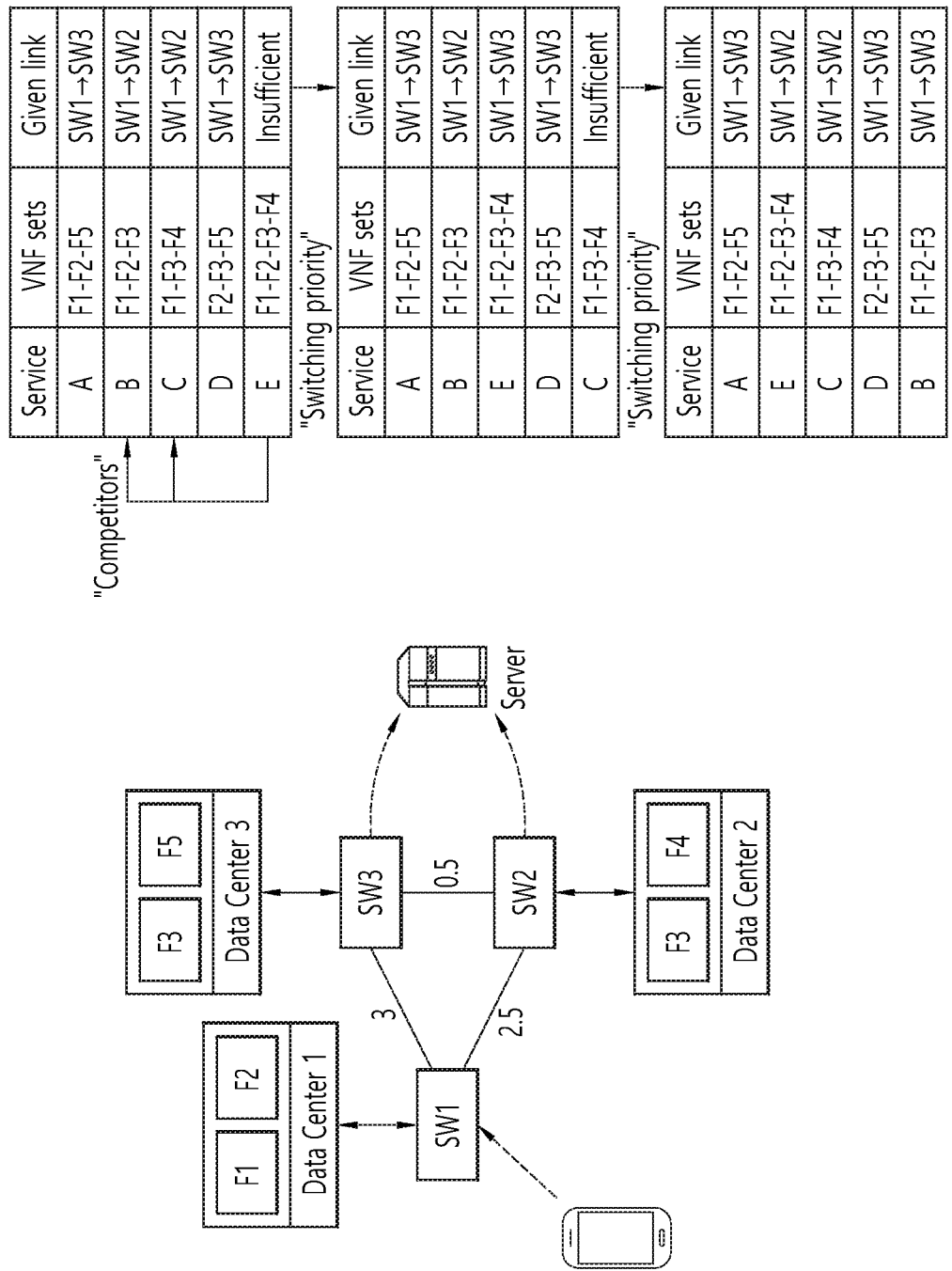
FIG. 10 shows an example in which a master problem and a slave problem are solved by changing priority.

FIG. 10 shows an example in which a master problem and a slave problem are solved by changing priority.

For example, if data centers are present as in FIG. 10, a flow of packets transmitted by a UE is directed toward SFs within the data center. In this case, a classifier classifies the packets, determines that which SFC is appropriate, adds a header to a corresponding packet, and delivers the packet to the data center of an SGi-LAN. Each SFF determines that the packet will be delivered to which link by checking a corresponding header. For example, assuming that five services (services A, B, C, D, and E) operate in the network of FIG. 10, data centers operate some of the F1, F2, F3, F4, and F5. In particular, the packet flow is delivered to a data center 2 or a data center 3 in order to receive service in F3. Furthermore, a number indicated in each link means the number of services that may be accommodated by a corresponding link.

In accordance with the first on the right of FIG. 10, there are service requests A, B, C, D, and E. When SFPs are sequentially generated, a service cannot be accommodated because the bandwidth of the service E is insufficient. In this case, if SFCs that must receive services in F3 in order to operate the five services are steered, all of the services can be accommodated. Accordingly, the master problem solution unit of the SDN controller selects a competitor, selects the service B and the service C, that is, competitors of the not-accommodated service E, and changes the priority of the service C in a low priority order from among the competitor and the priority of the service E. After the change, the service C is also not accommodated as the results of the execution of a solution for the master problem and a solution for the slave problem. Finally, after priority between the service B, that is, a competitor, and the service B that has not been initially accommodated, is switched, if a solution for the master problem and a solution for the slave problem are performed, an SFP capable of accommodating all of the five services is configured.

Figure 11:
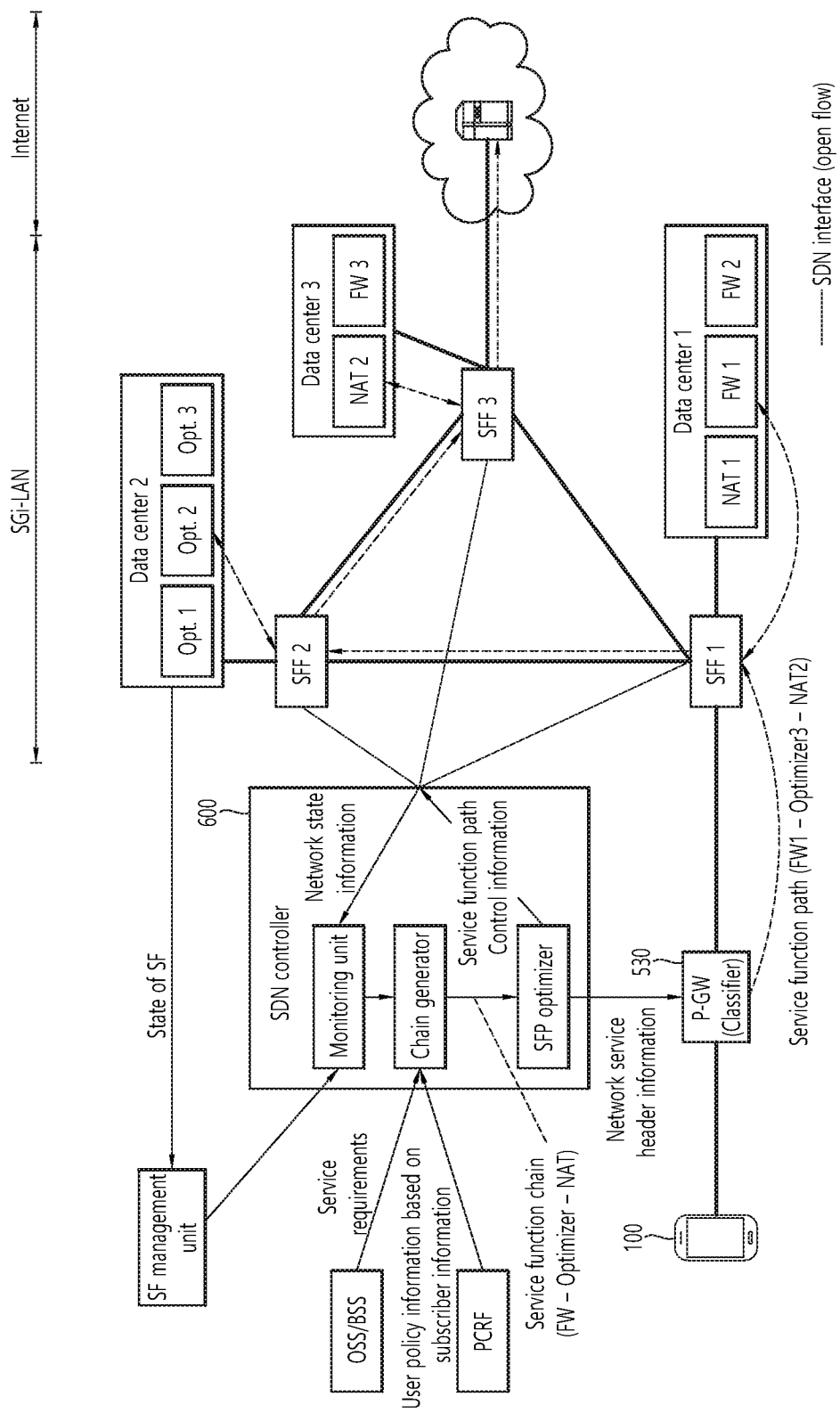
FIG. 11 shows a modified example of the structure of network virtualization shown in FIG. 9 and an operation thereof.

FIG. 11 shows a modified example of the structure of network virtualization shown in FIG. 9 and an operation thereof.

Referring to FIG. 11, an SDN controller is present within EPC, and includes a monitoring unit, a chain generator (CG) and an SFP optimizer.

The monitoring unit monitors the state of a network (e.g., the state of a switch and SF, the state of a link, and the state of a queue). The chain generator (CG) generates an SFC corresponding to each service based on obtained policies. The SFP optimizer generates an optimal SFP based on a given SFC. The SFP optimizer includes the master problem solution unit and the slave problem solution unit shown in FIG. 9.

Figure 12:
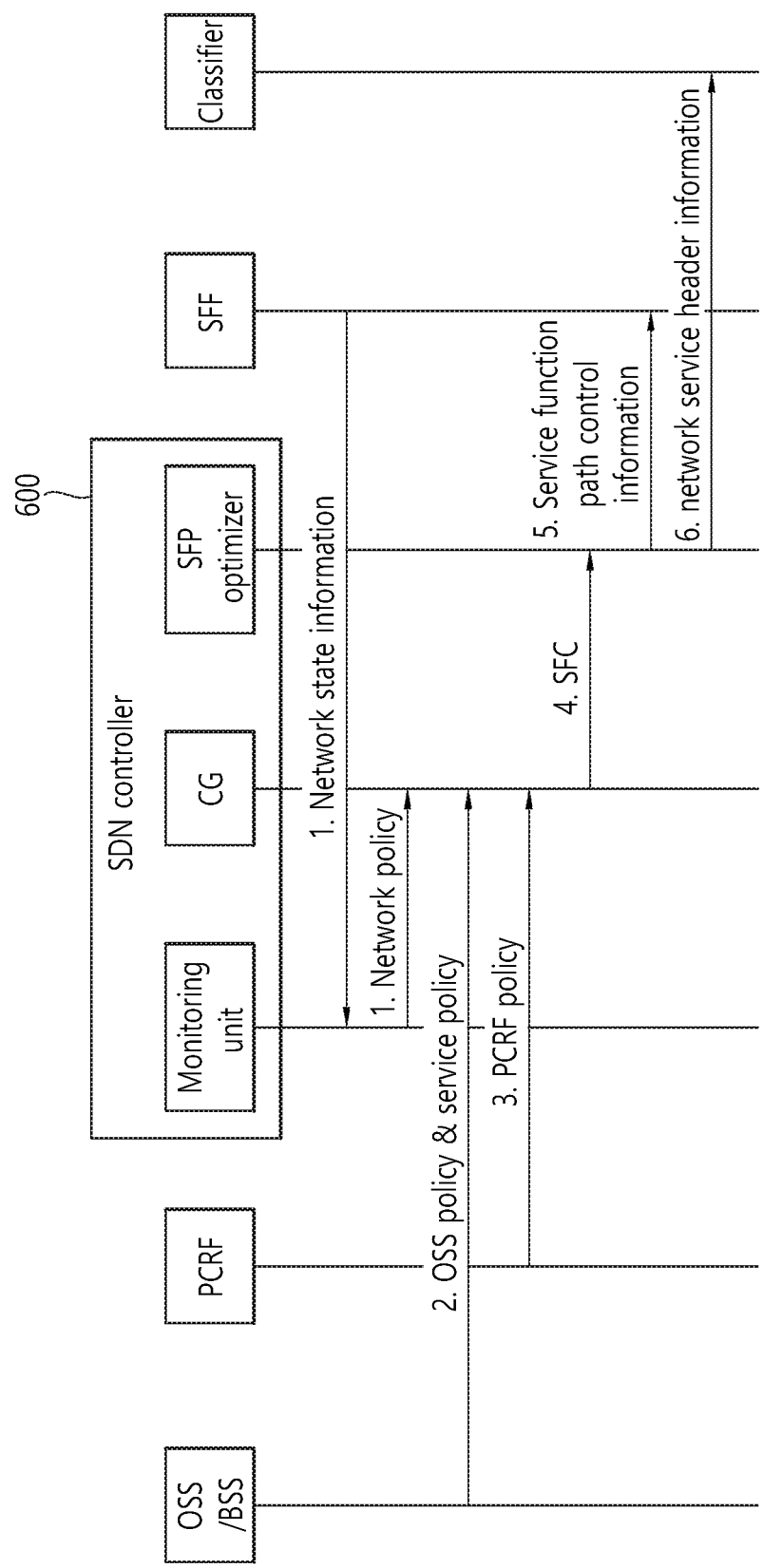
FIG. 12 shows an example of the generation of an SFP.

FIG. 12 shows an example of the generation of an SFP.

Referring to FIG. 12, the monitoring unit of the SDN controller collects network information (switch state, link bandwidth information, queue information, etc.) from each of switches (SFF) within an (S)Gi-LAN. The monitoring unit of the SDN controller generates network policy information based on the collected information and transmits the network policy information to the chain generator (CG) within the SDN controller.

Meanwhile, an OSS/BSS transmits OSS policy information and requirements for a corresponding service to the chain generator (CG) of the SDN controller.

Furthermore, like the PCRF, the OSS/BSS transmits user policy information based on subscriber information to the chain generator (CG) of the SDN controller.

The chain generator (CG) of the SDN controller generates an SFC suitable for a corresponding service based on the received policies, and transmits the SFC to the SFP optimizer within the SDN controller.

The SFP optimizer of the SDN controller finds an optimal SF set based on the obtained SFC and generates an optimal SFP. Furthermore, the SFP optimizer updates a routing table by transmitting the optimal SFP to a classifier and SFFs.

Meanwhile, if a change of a chain is required due to a requirement change (policy information, time zone information, a subscriber condition, network state, etc.), a change procedure for an SFP is necessary.

For example, if there is a requirement change for a service having low priority due to i) a requirement change according to a time zone, ii) a requirement change according to a time zone and subscriber information, and iii) a network state (upon excessive load sensing), a change procedure for an SFP is necessary.

Figure 13:
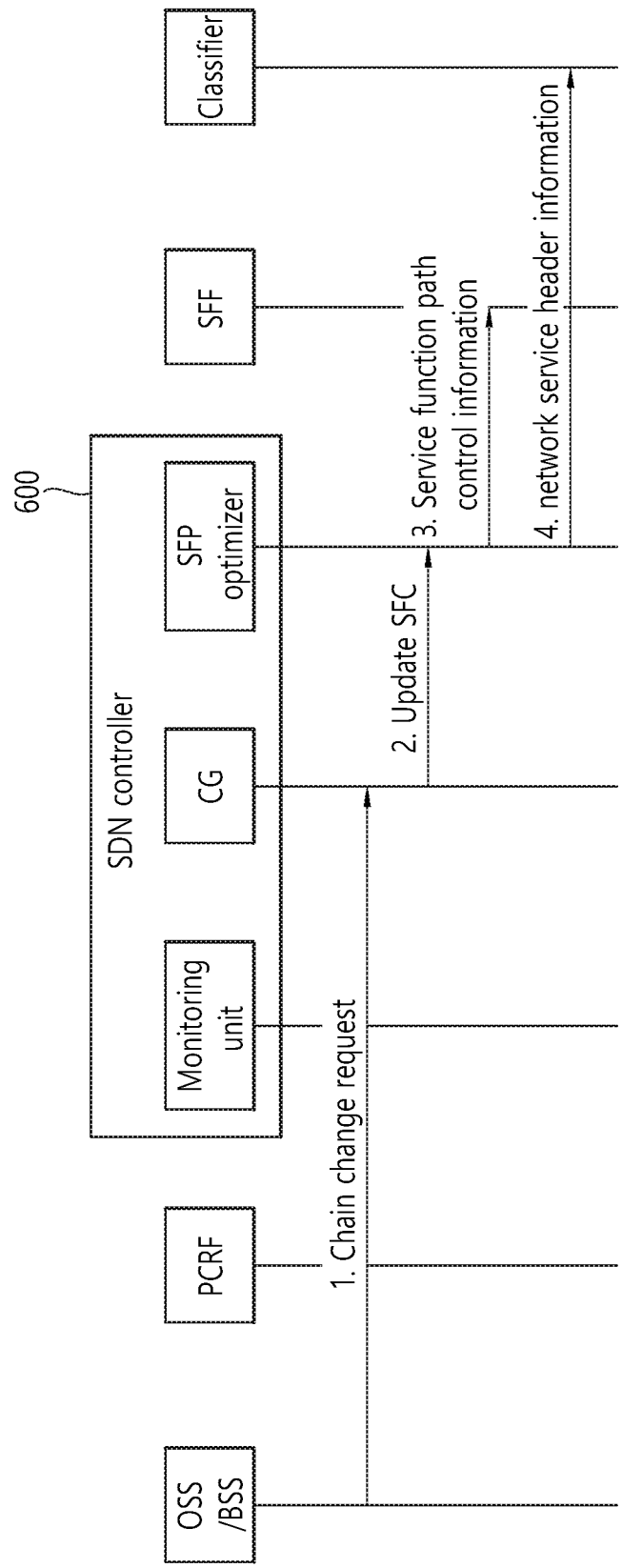
FIG. 13 shows an example of an SFP change according to a request from an OSS/BSS.

FIG. 13 shows an example of an SFP change according to a request from the OSS/BSS.

Referring to FIG. 13, if the policy of the OSS/BSS and the requirements are changed or the requirements of a service operator are changed, the OSS/BSS changes a service function defined to be essentially performed by a service operator or changes priority between service functions. If a change of an SF is necessary accordingly, the OSS/BSS may transmit a service chain request message to the chain generator (CG) within the SDN controller.

Accordingly, the chain generator (CG) of the SDN controller generates a new SFC by incorporating changed policy information into the existing information.

The chain generator (CG) of the SDN controller transmits the updated SFP to the SFP optimizer. The SFP optimizer finds an optimal SF set based on the obtained SFC and generates an optimal SFP. Furthermore, the SFP optimizer updates a routing table by transmitting the optimal SFP to the classifier and the SFFs.

Figure 14:
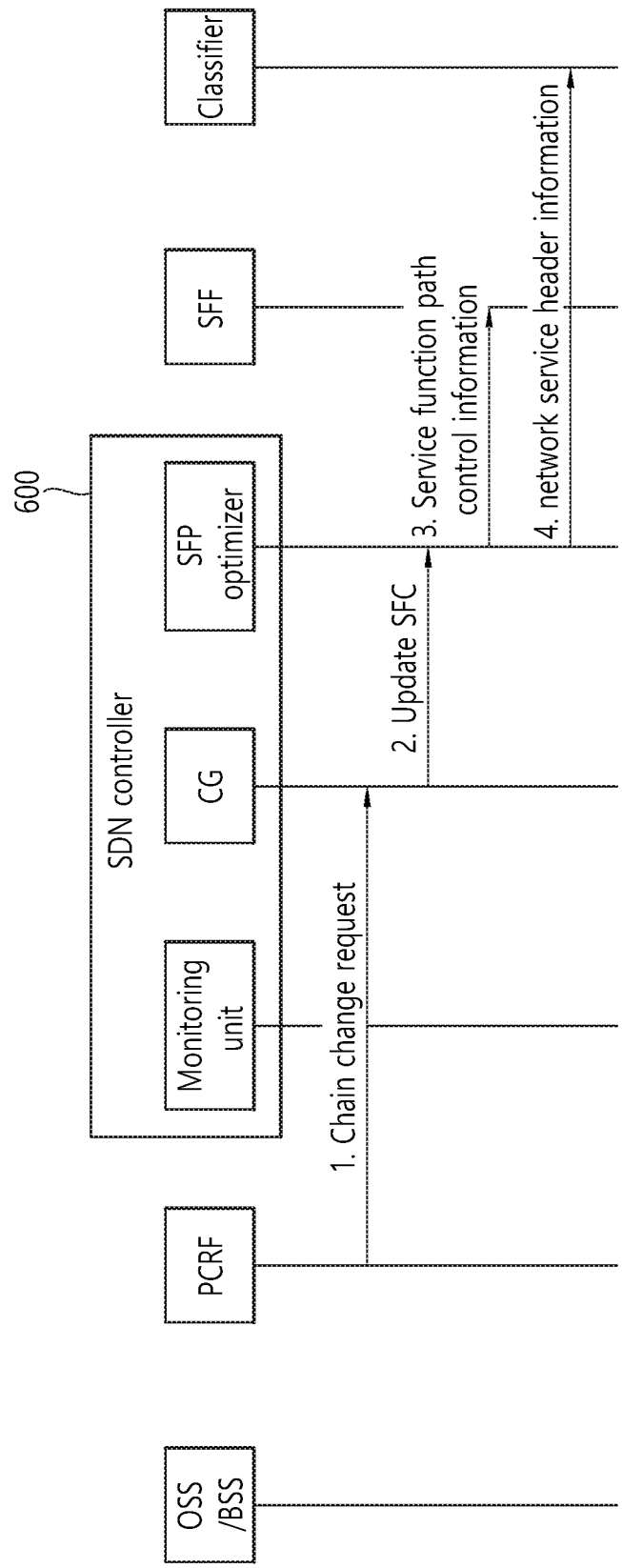
FIG. 14 shows an example of an SFP change according to a request from a PCRF.

FIG. 14 shows an example of an SFP change according to a request from the PCRF.

Referring to FIG. 14, if the policy of the PCRF is changed (e.g., if the total data capacity of a specific service that may be used by a subscriber is exceeded, if the available time of a specific service is changed, if the policy of a service is changed because a user pays for additional use and thus the corresponding service resumes to be temporarily enabled) or if information that may be collected/processed by the PCRF is changed, the PCRF may transmit a chain change request message to the chain generator (CG) of the SDN controller in order to request a change of an SFC.

Accordingly, the chain generator (CG) of the SDN controller generates a new SFC by incorporating changed policy information into the existing information.

The chain generator (CG) of the SDN controller transmits the updated SFP to the SFP optimizer. The SFP optimizer finds an optimal SF set based on the obtained SFC and generates an optimal SFP. Furthermore, the SFP optimizer updates a routing table by transmitting the optimal SFP to the classifier and the SFFs.

Figure 15:
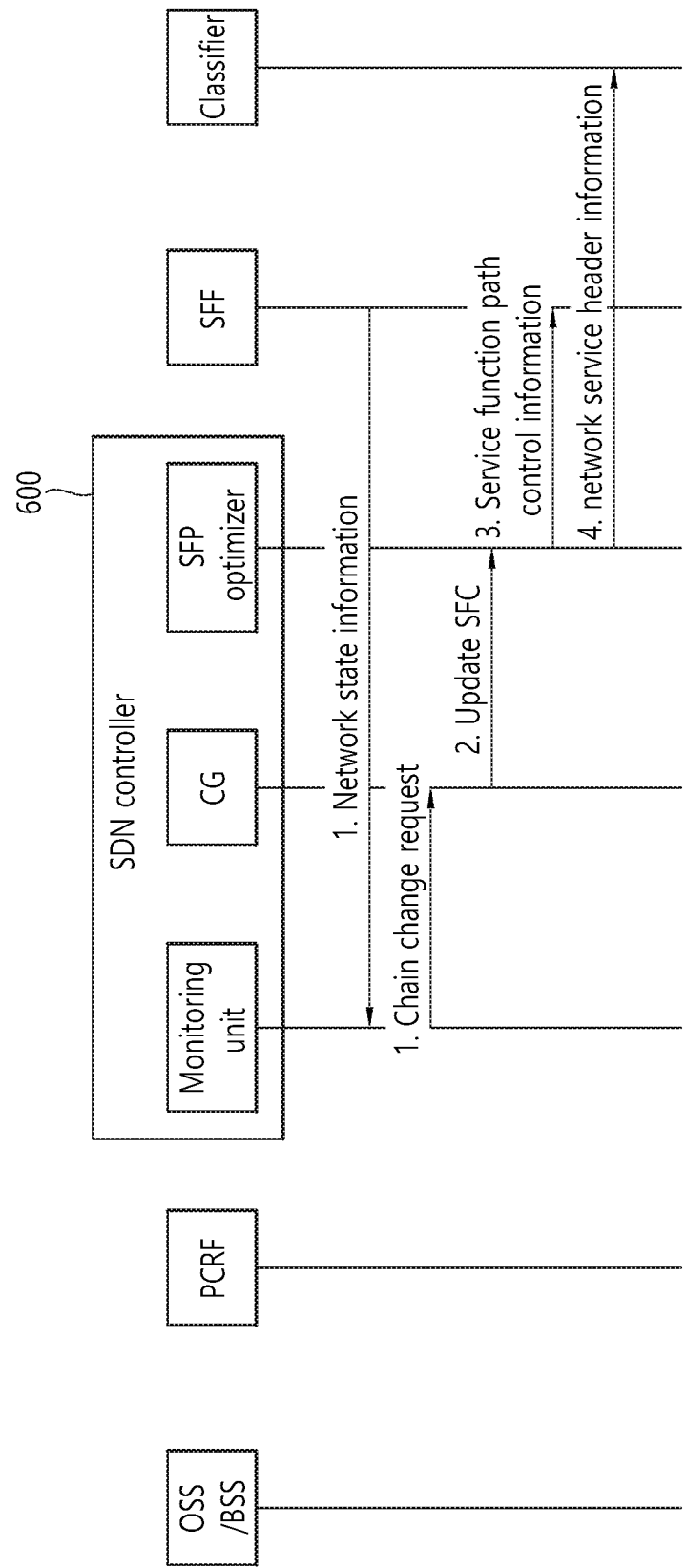
FIG. 15 shows an example of an SFP change according to a request from an SFF.

FIG. 15 shows an example of an SFP change according to a request from the SFF.

Referring to FIG. 15, if a network state is changed (e.g., if the omission of a specific service function for a service having low priority is necessary due to excessive load sensing), the SFF may transmit a chain change request message to the chain generator (CG) of the SDN controller.

Accordingly, the chain generator (CG) of the SDN controller generates a new SFC by incorporating changed policy information into the existing information.

The chain generator (CG) of the SDN controller transmits the updated SFP to the SFP optimizer. The SFP optimizer finds an optimal SF set based on the obtained SFC and generates an optimal SFP. Furthermore, the SFP optimizer updates a routing table by transmitting the optimal SFP to the classifier and the SFFs.

As described above, in accordance with the disclosure of this specification, there is proposed the method of finding an optimal SFP in which the state of a network has been taken into consideration in a wireless mobile communication network. In particular, there is proposed a hierarchical solution having low complexity in which a network state has been taken into consideration. The present method may operate in conjunction with various routing schemes depending on a network policy. Furthermore, it is possible to find an optimal SFP for each service based on the requirements (delay sensitive or BW sensitive) of each service.

The contents described so far may be implemented in hardware. This is described with reference to the drawing.

Figure 16:
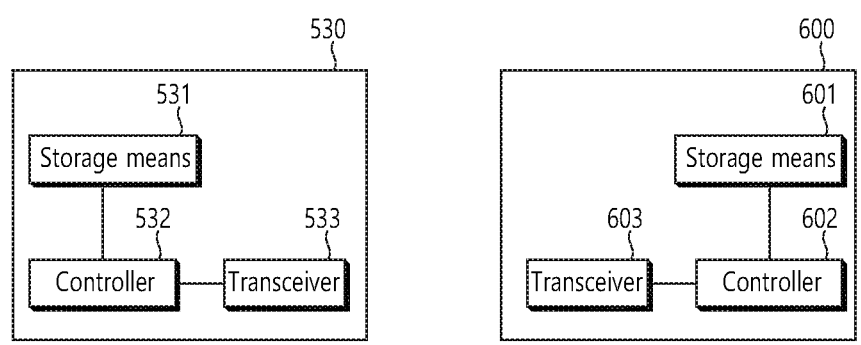
FIG. 16 is a block diagram of a classifier 530 and an SDN controller 600 according to an embodiment of the present invention.

FIG. 16 is a block diagram of a classifier 530 and an SDN controller 600 according to an embodiment of the present invention.

As shown in FIG. 16, the classifier 530 includes storage means 531, a controller 532 and a transceiver 533. Furthermore, the SDN controller 600 includes storage means 601, a controller 602 and a transceiver 603.

The storage means 531, 601 stores the aforementioned method.

The controllers 532 and 602 control the storage means 531 and 601 and the transceivers 533 and 603. Specifically, the controllers 532 and 602 execute methods stored in the storage means 531 and 601, respectively. Furthermore, the controllers 532 and 602 transmit the aforementioned signals through the transceivers 533 and 603.

Although the preferred embodiments of the present invention have been illustrated, the scope of the present invention is not limited to only such specific embodiments, and the present invention may be modified, changed or improved in various forms within the spirit of the present invention and a category written in the claims.

What is claimed is:

1. A method of determining a path for service functions (SFs) in which network nodes have been virtualized, the method being performed by a software defined networking (SDN) controller and comprising:
generating a sequenced service function chain (SFC) of SFs based on user policy information, the user policy information being based on subscriber information, session policy information and state information of the SFs;
determining a service function path (SFP) by finding an optimal SF set based on the SFC;
updating the SFP based on that any one of the user policy information the session policy information and the state information of the SFs is changed,
wherein the SFP includes a plurality of service flows, SFCs for each of the plurality of service flows, priorities for the each of the plurality of service flows, and links, which connect SFCs for one service flow, for the each of the service flows,
determining that a request related to a first service flow, which is included in the plurality of service flows, is impossible to be processed based on insufficient capacity of a first link for the first service flow;
changing priorities of one or more service flows, including the first service flow and a second service flow included in the plurality of service flows, based on the determination that the request is impossible to be processed
wherein a second SFC for the second service flow includes at least one SF included in a first SFC for the first service flow; and
changing the SFP based on the changed priorities of the one or more service flows.

2. The method of claim 1, further comprising:
receiving the user policy information from a policy and charging rule function (PCRF); and
receiving the state information of the SFs from an SF management unit.

3. The method of claim 1, further comprising:
receiving service requirements, wherein the SFC is generated based on the service requirements, the user policy information, the session policy information and the state information of the SFs.

4. The method of claim 1, further comprising:
transmitting information related to the SFP to service function forward (SFF) and a classifier.

5. The method of claim 4, wherein the classifier is a packet data network-gateway (P-GW) or a traffic detection function (TDF).

6. The method of claim 1, wherein:
the SF comprises one or more virtualized firewalls, one or more virtualized optimizers, one or more virtualized network address translators (NATs), or one or more virtualized load balancers,
the SFC is related to a sequence of at least two of the one or more virtualized firewalls, the one or more virtualized optimizers, the one or more virtualized NATs, or the one or more virtualized load balancers, and
the SFP is related to a specific set of at least one of a plurality of the one or more virtualized firewalls, a plurality of the one or more virtualized optimizers, a plurality of the one or more virtualized NATs, or a plurality of the one or more virtualized load balancers.

7. A software defined networking (SDN) controller determining a path for service functions (SFs) in which network nodes have been virtualized, the SDN controller comprising:
a transceiver; and
a processor operatively coupled to the transceiver, wherein the processor is configured to:
generate a sequenced service function chain (SFC) of SFs based on user policy information, the user policy information being based on subscriber information, session policy information and state information of the SFs;
determine a service function path (SFP) by finding an SF set based on the SFC;
updating the SFP, based on that any one of the user policy information, the session policy information and the state information of the SFs is changed,
wherein the SFP includes a plurality of service flows, SFCs for each of the plurality of service flows, priorities for the each of the plurality of service flows, and links, which connect SFCs for one service flow, for the each of the service flows, determine that a request related to a first service flow, which is included in the plurality of service flows, is impossible to be processed based on insufficient capacity of a first link for the first service flow;

change priorities of one or more service flows, including the first service flow and a second service flow included in the plurality of service flows, based on the determination that the request is impossible to be processed wherein a second SFC for the second service flow includes at least one SF included in a first SFC for the first service flow; and change the SFP based on the changed priorities of the one or more service flows.

8. The SDN controller of claim 7, wherein:

the SF comprises one or more virtualized firewalls, one or more virtualized optimizers, one or more virtualized network address translators (NATs), or one or more virtualized load balancers, the SFC is related to a sequence of at least two of the one or more virtualized firewalls, the one or more virtualized optimizers, the one or more virtualized NATs, or the one or more virtualized load balancers, and the SFP is related to a specific set of at least one of a plurality of the one or more virtualized firewalls, a plurality of the one or more virtualized optimizers, a plurality of the one or more virtualized NATs, or a plurality of the one or more virtualized load balancers.

\* \* \* \* \*